J. M. CLINE.
CHUCK FOR MACHINE TOOLS.
APPLICATION FILED JAN. 6, 1915.
1,274,685.
Patented Aug. 6, 1918.
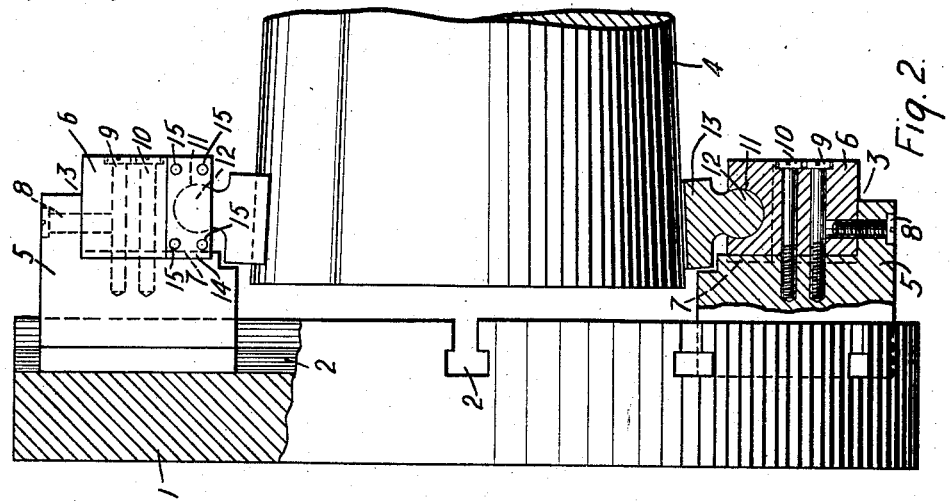
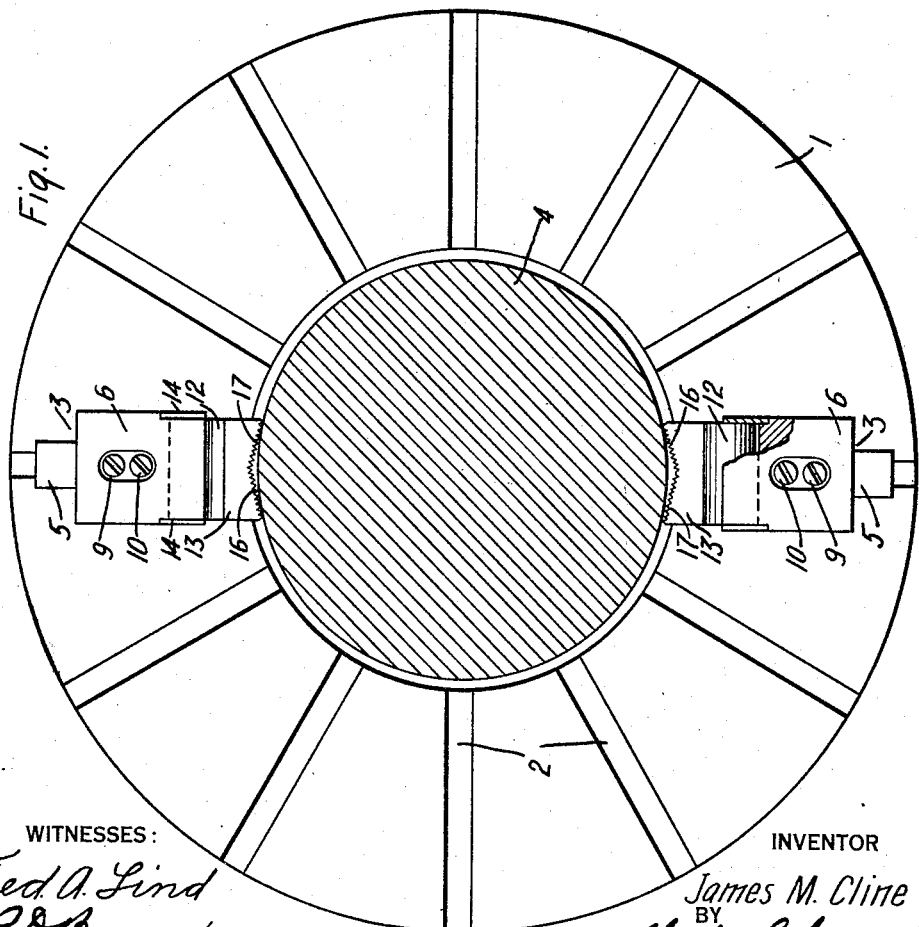
WITNESSES:
Fred A. Lind
R. D. Brown
INVENTOR
James M. Cline
BY
ATTORNEY

UNITED STATES PATENT OFFICE.

JAMES M. CLINE, OF TURTLE CREEK, PENNSYLVANIA, ASSIGNOR TO WESTINGHOUSE ELECTRIC AND MANUFACTURING COMPANY, A CORPORATION OF PENNSYLVANIA.

CHUCK FOR MACHINE-TOOLS.

1,274,685.

Specification of Letters Patent.

Patented Aug. 6, 1918.

Application filed January 6, 1915. Serial No. 799.

*To all whom it may concern:*

Be it known that I, JAMES M. CLINE, a citizen of the United States, and a resident of Turtle Creek, in the county of Allegheny and State of Pennsylvania, have invented a new and useful Improvement in Chucks for Machine-Tools, of which the following is a specification.

My invention relates to chucks for machine tools such as lathes, boring mills and the like, and it has for its object to provide a jaw for machine tool chucks that shall be simple in construction, positive in operation and capable of automatically adapting itself to firmly grip work of any shape within wide limits.

The work-holding chucks with which lathes and other machine tools are commonly equipped are provided with jaws that have their work-engaging faces parallel to the general axis of the work and perpendicular to the head plate of the machine. Such jaws operate satisfactorily when the work is cylindrical or of some other form having parallel straight sides, for the jaws can then engage the work throughout their length. When, however, the work is irregular, rough, or tapered, ordinary chuck jaws can engage the work only at a few points, and if the work happens to be tapered so as to be larger outside of the jaws than between them, the pressure of the jaws tends to push the work out of engagement with the chuck. Auxiliary holding devices, such as lathe dogs with set-screw attachments, must be used with ordinary chucks in order to hold work of this character in place.

According to my present invention, I provide a jaw for machine chucks that automatically adapts itself to irregular or tapered work. It consists essentially of a block adapted to be bolted to a standard chuck, and having associated with it a movable working member which is pivoted on an axis parallel to the head plate of the machine, and which is provided with a hollowed and roughened face for engagement with the work.

Of the accompanying drawings, Figure 1 is a front elevational view of the head plate of a machine tool provided with a pair of chucks constructed in accordance with my invention, and Fig. 2 is a side view, partially in elevation and partially in section, of the chuck shown in Fig. 1.

In the figures of the drawing, 1 represents the head plate of a lathe or other machine tool provided with the usual T-slots 2 and with a pair of chucks 3 that are slidably disposed in the T-slots for the purpose of gripping or holding an object 4, which, as shown, is a circular tapered body, but which may be of many other configurations, either regular or irregular.

Each of the chucks 3 comprises a body member 5 of standard construction, and a rectangular block 6 provided with a channel 7 for engagement with the body member 5 and also provided with openings to receive tap bolts 8, 9 and 10, by means of which the block 6 may be attached to the body member 5. The block 6 is provided, at its lower end, with a transverse rounded recess 11, of somewhat more than semi-circular outline, that is adapted to receive a projection 12 of generally cylindrical shape formed upon a working member 13. The projection 12 is loosely disposed in the recess 11, and is prevented from moving lengthwise therein by means of side plates 14 that are secured to the block 6 by means of screws 15. The sides of the recess 11 are sufficiently contracted to hold the projection 12 within the recess, which serves as a bearing for the projection and allows the working member 13 to turn through a considerable angle.

The working face of the member 13 is angularly hollowed out, as shown at 16 in Fig. 1, and is preferably roughened by means of corrugations 17. The hollow face insures close engagement between the chuck and work that is rounded or irregular in form, and the corrugations 17 increase the rigidity with which the chuck engages the work.

It will be obvious from the foregoing description, and from the drawing, that the working member 13, when applied to the surface of the article to be held in the chuck, adapts itself to the shape of the article by rotative movement to the necessary extent about the pivot of the cylinder projection 12, and that contact between the work and the full length of the jaws is thereby insured. Various structural modifications may readily be effected in the device which I have shown and described without departing from the principles of my invention, and it is therefore to be understood that my invention comprehends all such modifications and changes and is limited only by the scope of the appended claims.

I claim as my invention:

1. A chuck for machine tools comprising a body member adapted to be received in the slots of a machine tool head plate, a block secured to the said body member by means of screws extending in two directions, the said block being provided with a generally cylindrical recess extending the full length of one of its sides, a working jaw member provided with a projection conforming in shape to the said recess and movably received therein, and plates secured to the said body member and closing the ends of the said recess.

2. A chuck for machine tools comprising a body member having an overhanging portion, a block secured to the said body member by means of screws extending in two directions, the said block being disposed in the angle formed by the said overhanging portion and the remainder of the said body member, and being provided with a recess of generally cylindrical form and of more than semi-circular cross-section, and a working jaw member provided with a projection conforming in shape to the said recess and movably received therein.

In testimony whereof I have hereunto subscribed my name this 31st day of Dec., 1914.

JAMES M. CLINE.

Witnesses:
C. B. AUEL,
B. B. HINES.

Copies of this patent may be obtained for five cents each, by addressing the "Commissioner of Patents, Washington, D. C."